US008203605B1

(12) United States Patent
Starner

(10) Patent No.: US 8,203,605 B1
(45) Date of Patent: Jun. 19, 2012

(54) POINT-OF-VIEW OBJECT SELECTION

(75) Inventor: Thad Starner, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/105,828

(22) Filed: May 11, 2011

(51) Int. Cl.
*H04N 7/00* (2011.01)
*H04N 7/18* (2006.01)

(52) U.S. Cl. ...................................... 348/115

(58) Field of Classification Search .................. None
See application file for complete search history.

(56) References Cited

U.S. PATENT DOCUMENTS

| | | | |
|---|---|---|---|
| 6,094,215 | A | 7/2000 | Sundahl et al. |
| 6,628,715 | B1 * | 9/2003 | Iu et al. ................ 375/240.16 |
| 6,654,483 | B1 | 11/2003 | Bradski |
| 7,030,909 | B2 | 4/2006 | Grosvenor et al. |
| 7,065,242 | B2 | 6/2006 | Petrov et al. |
| 7,103,231 | B2 | 9/2006 | Cornog et al. |
| 7,119,831 | B2 | 10/2006 | Ohto et al. |
| 7,266,220 | B2 | 9/2007 | Sato et al. |
| 7,286,688 | B2 | 10/2007 | Yamamoto et al. |
| 7,298,907 | B2 | 11/2007 | Hasegawa |
| 7,376,250 | B2 | 5/2008 | Higaki et al. |
| 7,379,566 | B2 | 5/2008 | Hildreth |
| 7,535,463 | B2 * | 5/2009 | Wilson ........................ 345/175 |
| 7,778,466 | B1 * | 8/2010 | Medasani et al. ............ 382/199 |
| 7,809,193 | B2 | 10/2010 | Iwasaki et al. |
| 2002/0085843 | A1 | 7/2002 | Mann |
| 2002/0145665 | A1 | 10/2002 | Ishikawa et al. |
| 2009/0315740 | A1 | 12/2009 | Hildreth et al. |

OTHER PUBLICATIONS

Abdollahian, Golnaz et al., Camera Motion-Based Analysis of User Generated Video, IEEE Transactions on Multimedia, Jan. 2010, vol. 12, No. 1, pp. 28-41.
Arbel, Tal et al., Recognizing Objects from Curvilinear Motion, BMVC 2000, McGill University, Center for Intelligent Machines, Montreal, Quebec, Canada.
Nakamura, Yuichi, et al., Structuring Personal Experiences Analyzing Views from a Head-Mounted Camera, Institute of Engineering Mechanics and Systems, University of Tsukuba, Japan.
Funkhouser, Thomas et al., A Search Engine for 3D Models, NEC Research Institute, ACM Transactions on Graphics, vol. V., No. N.
Cheatle, Phil, Media Content and Type Selection from Always-on Wearable Video, Proceedings of the 17th International Conference on Pattern Recognition, ICPR '04, IEEE Computer Society.

(Continued)

*Primary Examiner* — Nhon Diep
(74) *Attorney, Agent, or Firm* — McDonnell Boehnen Hulbert & Berghoff LLP

(57) ABSTRACT

Example methods and systems are disclosed that utilize optical-flow analysis to help recognize the performance of a predetermined user-action by a user of a wearable computer, such as a user-action for selecting an object within the user's view. An example method may involve a wearable computing device: (a) receiving a video from a video camera of a wearable computing device: (b) determining optical flow for the video; (c) determining that an optical-flow differential exists at an area within the optical flow for the video; and (d) responsive to determining that the optical-flow differential exists at the area within the optical flow: (i) identifying an object that is located at the area where the optical-flow differential exists; (ii) performing a search on the object that is located at the area where the optical-flow differential exists; and (iii) causing a graphical display to display information that corresponds to results from the search.

18 Claims, 12 Drawing Sheets

OTHER PUBLICATIONS

Starner, Thad, Augmented Reality Through Wearable Computing, M.I.T Media Laboratory Perceptual Computing Section Technical Report No. 397, Massachusetts Institute of Technology, 1997, pp. 1-9.

Lucas, Bruce D., et al., An Iterative Image Registration Technique with an Application to Stereo Vision, Proceedings of Imaging Understanding Workshop, Computer Science Dept., Carnegie-Mellon University, 1981, pp. 121-130.

Wither, Jason, et al., Pictorial Depth Cues for Outdoor Augmented Reality, University of California, Santa Barbara, California.

Abdollahian, Golnaz et al, Camera Motion-Based Analysis of User Generated Video, IEEE Transactions on Multimedia, Jan. 2010, vol. 12, No. 1, pp. 28-41.

Starner, Thad, Augmented Reality Through Wearable Computing, M.I.T. Media Laboratory Perceptual Computing Section Technical Report No. 397, Massachusetts Institute of Technology, 1997, pp. 1-9.

\* cited by examiner

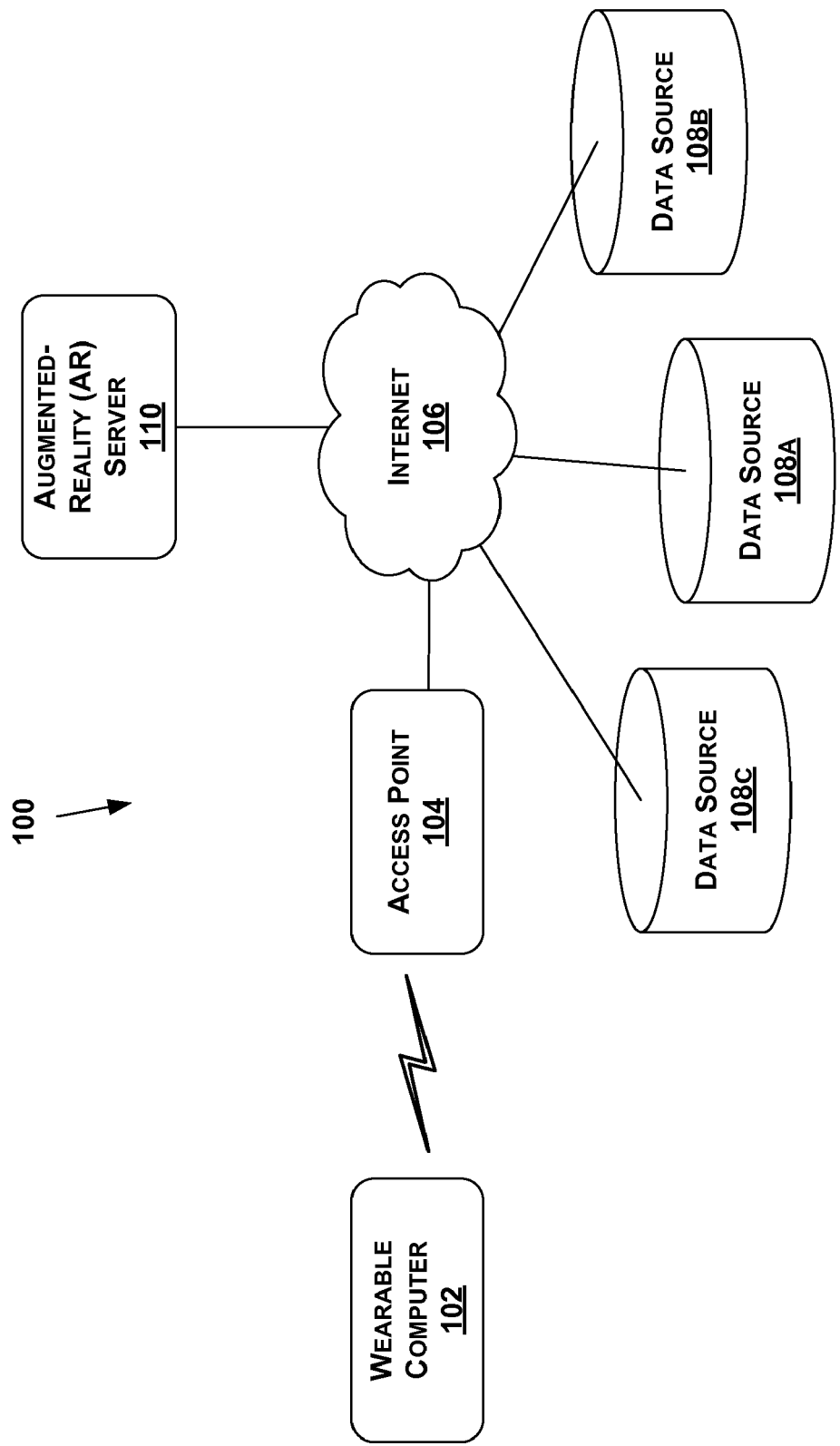

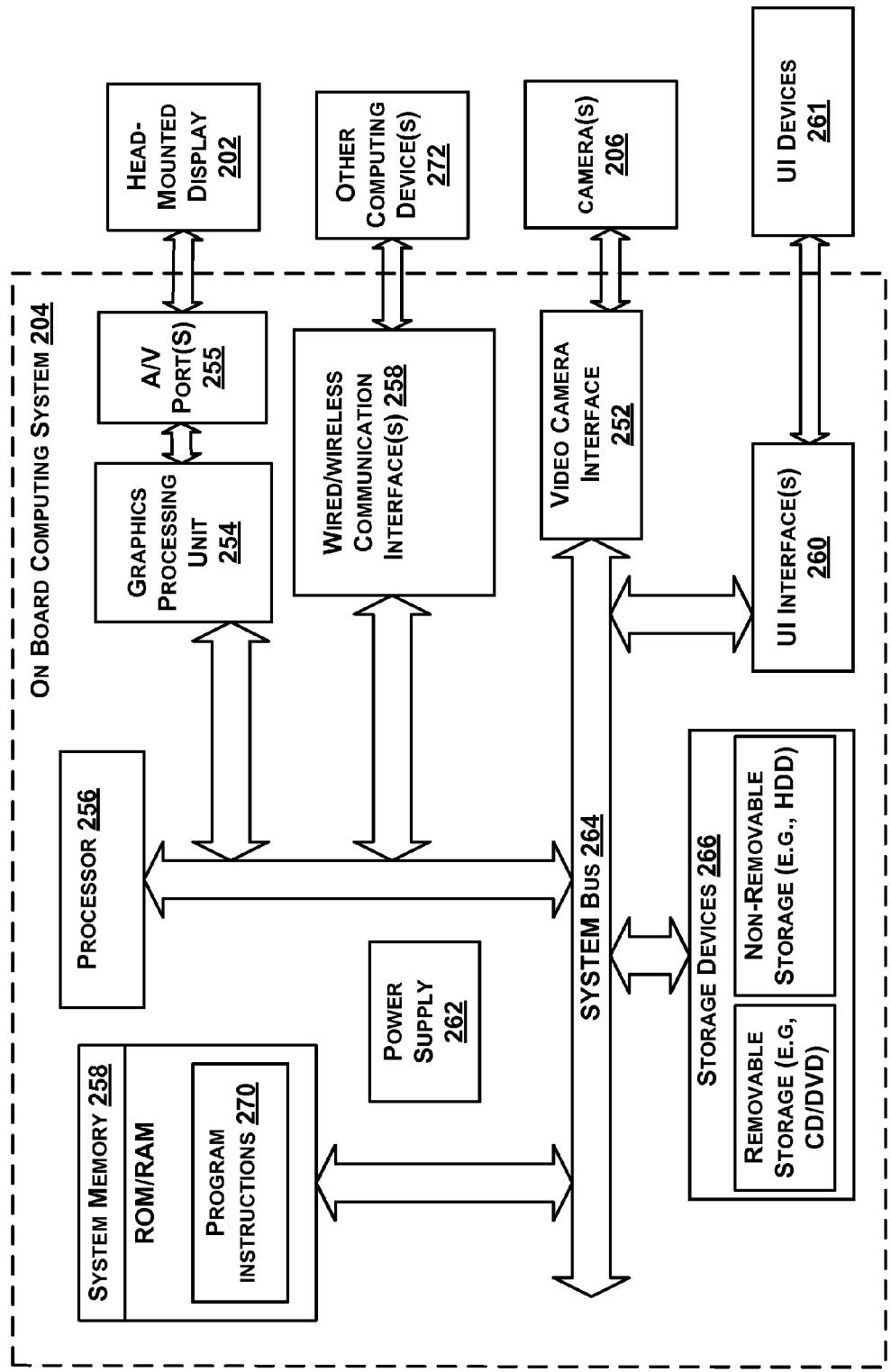

POINT-OF-VIEW OBJECT SELECTION

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "wearable" computers, are configured to sense and analyze a user's environment, and to intelligently provide information appropriate to the physical world being experienced by the user.

Wearable computers may sense a user's surrounding by, for example, determining a user's geographic location, using cameras and/or sensors to detect objects near to the user, using microphones and/or sensors to detect what a user is hearing, and using various other sensors to collect information about the environment surrounding the user. Further, wearable computers may use biosensors detect the user's own physical state. The information collected by the wearable computer may then be analyzed in order to determine what information should be presented to the user.

Many wearable computers include or take the form of a head-mounted display (HMD) that is worn by the user. An HMD typically provides a heads-up display near to the user's eyes. As such, HMDs may also be referred to as "near-eye" displays. HMDs may overlay computer-generated graphics (e.g., text, images, video, etc.) on the physical world being perceived by the user. HMDs that include displays in front of both of the user's eyes are referred to as "binocular" HMDs, while those that include a display in front of just one eye are referred to as "monocular" HMDs.

HMDs may integrate computer-generated graphics in the user's view of the physical world using a number of techniques. For example, "see-through" HMDs may display graphics on a transparent surface so that the user sees the graphics overlaid on the physical world. "See-around" HMDs, on the other hand, may overlay graphics on the physical world by placing an opaque display close to the user's eye in order to take advantage of the sharing of vision between a user's eyes and create the effect of the display being part of the world seen by the user.

SUMMARY

In one aspect, an example method may involve a wearable computer or other device: (a) receiving a video from a video camera of a wearable computing device; (b) determining optical flow for the video; (c) determining that an optical-flow differential exists at an area within the optical flow for the video; and (d) responsive to determining that the optical-flow differential exists at the area within the optical flow: (i) identifying an object that is located at the area where the optical-flow differential exists; (ii) performing a search on the object that is located at the area where the optical-flow differential exists; and (iii) causing a graphical display to display information that corresponds to results from the search.

In an example embodiment, the optical-flow differential may be characteristic of a predetermined user-action of a user of a wearable computing device. For example, the optical-flow differential may be characteristic of an object remaining in substantially the same location within the user's field of view as the user moves along a substantially circular path around the object. As another example, the optical-flow differential may be characteristic of fixation on the object while the object rotates. In such embodiments, determining that the optical-flow differential exists at the area within the optical flow for the video may involve: (i) determining that optical flow within the area is of substantially different magnitude than optical flow outside of the area; and (ii) determining that at least a portion of the optical flow for the video has a curvature that is characteristic of a predetermined user-action associated with selection of the object.

In another aspect, a non-transitory computer readable medium having instructions stored thereon is disclosed. The instructions may include: (a) instructions for receiving video from a video camera of a wearable computing device; (b) instructions for determining optical flow for the video; (c) instructions for determining when an optical-flow differential exists at an area in the optical flow for the video; (d) instructions for, responsive to determining that the optical-flow differential exists, identifying an object in the video that is located at the area of the optical-flow differential; (e) instructions for causing a search to be performed on the object that is located at the area of the optical-flow differential; and (f) instructions for causing a graphical display to display information that corresponds to results from the search.

In yet another aspect, a wearable-computing system is disclosed. The wearable-computing system may include: (a) an interface to a head-mounted display, wherein the head-mounted display is configured to display computer-generated information related to a point-of-view of a user; (b) an interface to a video camera configured to substantially track the point-of-view of the user; and (c) an on-board computing system configured to: (i) determine optical flow for video from the video camera; (ii) determine when an optical-flow differential exists at an area in the optical flow for the video; (iii) responsive to determining that the optical-flow differential exists, identify an object in the video that is located at the area of the optical-flow differential; (iv) perform a search on the object that is located at the area of the optical-flow differential; and (v) cause the head-mounted display to display graphical information that corresponds to results from the search.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1 is a simplified block diagram illustrating a system in which an example embodiment of a wearable computing device can be implemented.

FIG. 2C is a simplified block diagram showing components of an example wearable computing device in greater detail.

DETAILED DESCRIPTION

Figure 2A:
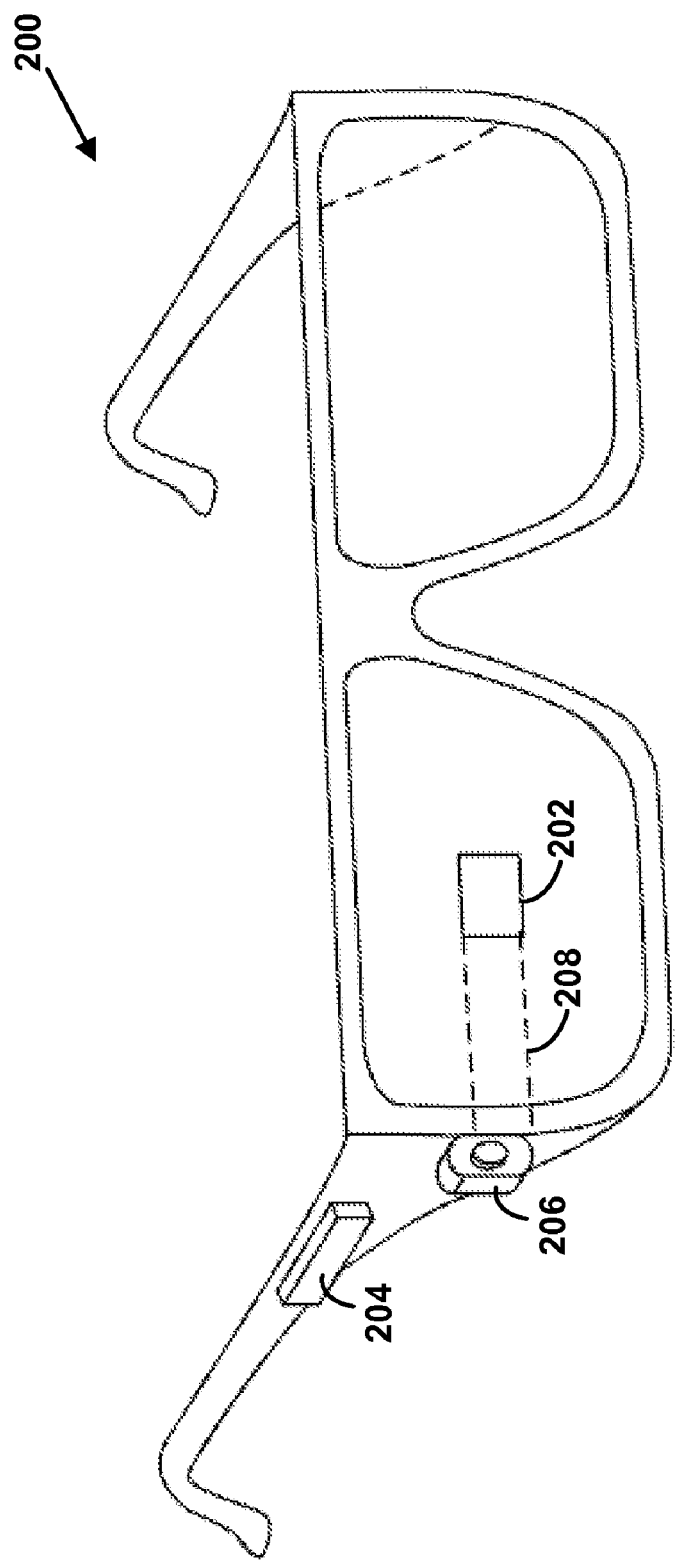
FIG. 2A is a three-dimensional rendering of an example wearable computing device that takes the form of a head-mounted display.

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. Overview

In order to sense a user's environment, a wearable computer may include a "point-of-view" video camera that is aligned with the user's frame of reference and mounted so as to track the movement of the user's head. By effectively capturing what the user is seeing at a given point in time, this video can be analyzed to detect objects and/or people within the user's view, to identify these objects and/or people, and to display information in the HMD that corresponds to these objects and/or people. Furthermore, analysis of the video may be used to determine where a given object or person is located in the user's frame of reference, and to display corresponding information in the HMD such that the user sees the corresponding information as "floating" over or near the given object or person.

As an example, when a user is looking at a friend, a video camera on the user's HMD may capture video of the friend. The video can then be analyzed using, for example, well-known facial recognition techniques. As such, the friend may be identified, and information related to the friend may be displayed so that the user sees the information proximate to their friend. For example, the HMD may display the friend's name, contact information, birthday, etc.

While many techniques have been developed for identifying objects and intelligently displaying related information on an HMD, these techniques do not provide for significant user interaction. Specifically, while such techniques allow objects and people to be recognized and identified, they do not allow the user to specify a particular object that the user is interested in.

The methods and systems described herein help provide for computer recognition of a user-selected object via application of motion-analysis techniques to video. These motion-analysis techniques detect when the video from a point-of-view video camera is characteristic of a predetermined user-action that is associated with the selection of an object by the user. In an example embodiment, optical-flow analysis is used to detect when an area with an "optical-flow differential" exists in the video. As such, example methods and systems may help provide the user of wearable computer the ability to select an object in the user's field of view by performing a predetermined action.

An exemplary embodiment stems from the realization that certain user-actions create a characteristic optical-flow differential in the area of a selected object. As one example, a user may rotate around an object, while keeping the object at the same location in their frame of reference (e.g., in the center of the user's view). This may result in the optical flow at the object being of significantly lesser magnitude than optical flow elsewhere in the video frame. In addition, video capturing this user-movement typically has optical flow with certain rotational characteristics, which correspond to the user circling a selected object. Accordingly, an example method may involve determining that a user has selected a particular object that is located in the area of such an optical-flow differential, and responsively performing an action on the selected object.

Herein, the optical flow of a video should be understood to be a measurement of the apparent motion of pixels in the video resulting from the movement of the objects in the video and the user relative to each other. Further, an area of optical-flow differential should be understood to mean an area in a video where the magnitude of optical flow is significantly different than elsewhere in the video.

II. Example Systems and Devices

FIG. 1 is a simplified block diagram illustrating a system in which an example embodiment of a wearable computing device can be implemented. As shown, the network 100 includes an access point 104, which provides access to the Internet 106. Provided with access to the Internet 106 via access point 104, wearable computer 102 can communicate with various data sources 108a-c, as well as Augmented-Reality (AR) server 110.

The wearable computer 102 may take various forms, and as such, may incorporate various display types to provide an augmented-reality experience. In example embodiment, wearable computer 102 includes a head-mounted display (HMD). For example, wearable computer 102 may include an HMD with a binocular display or a monocular display. Additionally, the display of the HMD may be, for example, an optical see-through display, an optical see-around display, or a video see-through display. More generally, the wearable computer 102 may include any type of HMD configured to provide an augmented-reality experience to its user.

In order to sense the user's environment and experiences, wearable computer 102 may include or be provided with input from various types of sensing and tracking devices. Such devices may include video cameras, still cameras, Global Positioning System (GPS) receivers, infrared sensors, optical sensors, biosensors, Radio Frequency identification (RFID) systems, wireless sensors, accelerometers, gyroscopes, and/or compasses, among others.

Furthermore, wearable computer 102 may include an integrated user-interface (UI) that allows the user to interact with the HMD. For example, wearable computer 102 may include various buttons and/or a touchscreen interface, which allow the user to provide input. As another example, wearable computer 102 may include a microphone configured to receive voice commands from the user. Furthermore, wearable computer 102 may include one or more interfaces that allow various types of user-interface devices to be connected to the wearable computer. For instance, wearable computer 102 may be configured for connectivity with various hand-held keyboards and/or pointing devices. More generally, wearable computer 102 may be configured to interface with almost any type of user-interface device.

Wearable computer 102 may include, at its core, an on-board computing system that includes hardware for the processing functions of the wearable computer. In particular, an on-board computing system may function, at least in part, to analyze the data collected by the sensing and tracking devices, as well user-input data provided via any UI, and based upon this analysis, determine what information should be displayed to the user via the HMD, and how this information should be arranged in the display.

Wearable computer 102 may additionally or alternatively rely on outside data sources in order to analyze the user's environment and/or to determine the appropriate information to display. In particular, while wearable computer 102 may incorporate on-board data storage, the amount of memory available in on-board storage may be limited due to size, weight, and/or cost restrictions associated with a wearable device such as wearable computer 102. As such, the wearable computer 102 may include a wired or wireless network interface via which wearable computer 102 can connect to the Internet 106 and access data sources 108a-c. The wearable computer 102 may be configured to connect to Internet 106 using one or more protocols such as 802.11, 802.16 (WiMAX), LTE, GSM, GPRS, CDMA, EV-DO, and/or HSPDA, among others. Furthermore, wearable computer 102 may be configured to connect to Internet 106 using multiple wired and/or wireless protocols. As one example, many current devices are configured for "3G" or "4G" data connectivity using a cellular communication protocol such as CDMA, GSM, or WiMAX, as well as for "WiFi" connectivity using 802.11. Other examples are also possible.

Access point 104 may take various forms, depending upon which protocol wearable computer 102 uses to connect to the Internet 106. For example, if wearable computer 102 connects using 802.11 or via an Ethernet connection, access point 104 may take the form of a wireless access point (WAP) or wireless router. As another example, if wearable computer 102 connects using a cellular air-interface protocol, such as a CDMA or GSM protocol, then access point 104 may be a base station in a cellular network, which provides Internet connectivity via the cellular network. Further, since wearable computer 102 may be configured to connect to Internet 106 using multiple wireless protocols, it is also possible that wearable computer 102 may be configured to connect to the Internet 106 via multiple types of access points.

Wearable computer 102 may be further configured to connect to AR server 110, either via the Internet (as shown) or possibly via a private network (which may provide a more secure connection). AR server 110, while optional, may help improve the performance of wearable computer 102. In particular, since size, weight, and/or cost constraints may limit data storage and processing capabilities of a device worn by the user, moving some (or possibly even all) of the data-processing functions for wearable computer 102 to a remote entity such as AR server 110 can provide increased processing power. This may be useful for the potentially data-intensive analysis of the data collected by the sensory and/or tracking devices of wearable computer 102, as well as for the control of the HMD display based thereon.

In a further aspect, AR server 110 may include data stores that allow for quicker retrieval of data supporting the augmented-reality experience for wearable computer 102. For example, AR server 110 may collect data specific to a given wearable computer 102 over time, which can then be used to customize the user's experience. Furthermore, AR server 110 may combine location-specific data collected from a number of different wearable computers at given locations. Such data may then be used in combination with current data from wearable computer 102's sensory devices to customize its HMD display to the current location of wearable computer 102 and/or to the specific user preferences and tendencies of the wearer of wearable computer 102. It should be noted that wearable computer 102 may itself include data storage in which the wearable computer stores similar data, and in fact may function without any support from an AR server. However, due to the size, weight, and/or cost constraints that may limit data-storage and processing capabilities of wearable computer 102's on-board computing system, a remote entity such as AR server 110 may provide wearable computer 102 with superior data-storage and/or data-retrieval capabilities, and thus may improve the performance of wearable computer 102.

FIG. 2A is a three-dimensional rendering of an example wearable computing device that takes the form of an HMD. As shown, wearable computing device 200 includes a monocular see-around display 202, which overlays computer-generated graphics in the user's view of the physical world. The see-around display 202 is controllable via an on-board computing system 204 that is coupled to the display via an optical waveguide 208. Wearable computing device 200 also includes a video camera 206, which is mounted on the frame of the HMD and oriented so as to generally track the wearer's frame of reference (i.e., the wearer's point of view). Furthermore, wearable computing device 200 incorporates an on-board computing system 204, which generally functions to analyze data received from video camera 206 (and possibly data from other sensory devices and/or user interfaces), and to control the display 202 accordingly. Furthermore, data making up graphics (e.g., video, images, text, etc.) may be relayed from on-board computing system 204 to display 202 via an optical waveguide.

The type of video camera 206 may be selected as a matter of engineering design choice. As such the video camera 206 may capture video at various different resolutions and/or at different frame rate (e.g., varying frames per second (fps)). Many video cameras with a small form-factor, such as those used in cell phones, webcams, etc., are well known to those skilled in the art, and may be incorporated in an example wearable computer. However, it should be understood that example embodiments are not limited to any particular type of video camera.

In an example embodiment, video camera 206 is mounted so as to capture the user's point-of-view. Specifically, video camera 206 is mounted on wearable computing device 200 so that it is positioned and oriented in the same an direction as the user's eyes to capture a view similar to the wearer's view. Other configurations are also possible. As just one example, a video camera may be mounted on the user's forehead or in between the user's eyes, and again oriented in the same direction as the user's eyes. Mounted as such, the video camera tracks the movement of the user's head, and thus the perspective of the recorded video at a given point in time will generally capture the user's frame of reference (i.e., the user's view) at that time. It is also possible that an example wearable computer may incorporate multiple video cameras, which may be configured to capture the same view, or to capture different perspectives or views.

In some example HMDs, a monocular video display 202 may be positioned and sized such that images being displayed appear to be overlaid upon or to "float" in user's view of the physical world, thus providing an experience in which computer-generated information is merged with and/or augments the user's perception of the physical world. To do so, on-board computing system 204 may be configured to analyze video footage that is captured by video camera 206 to intelligently determine (a) what graphics should be displayed, (b) and how the graphics should be displayed (e.g., location on the display, size of the graphics, etc.).

Figure 2B:
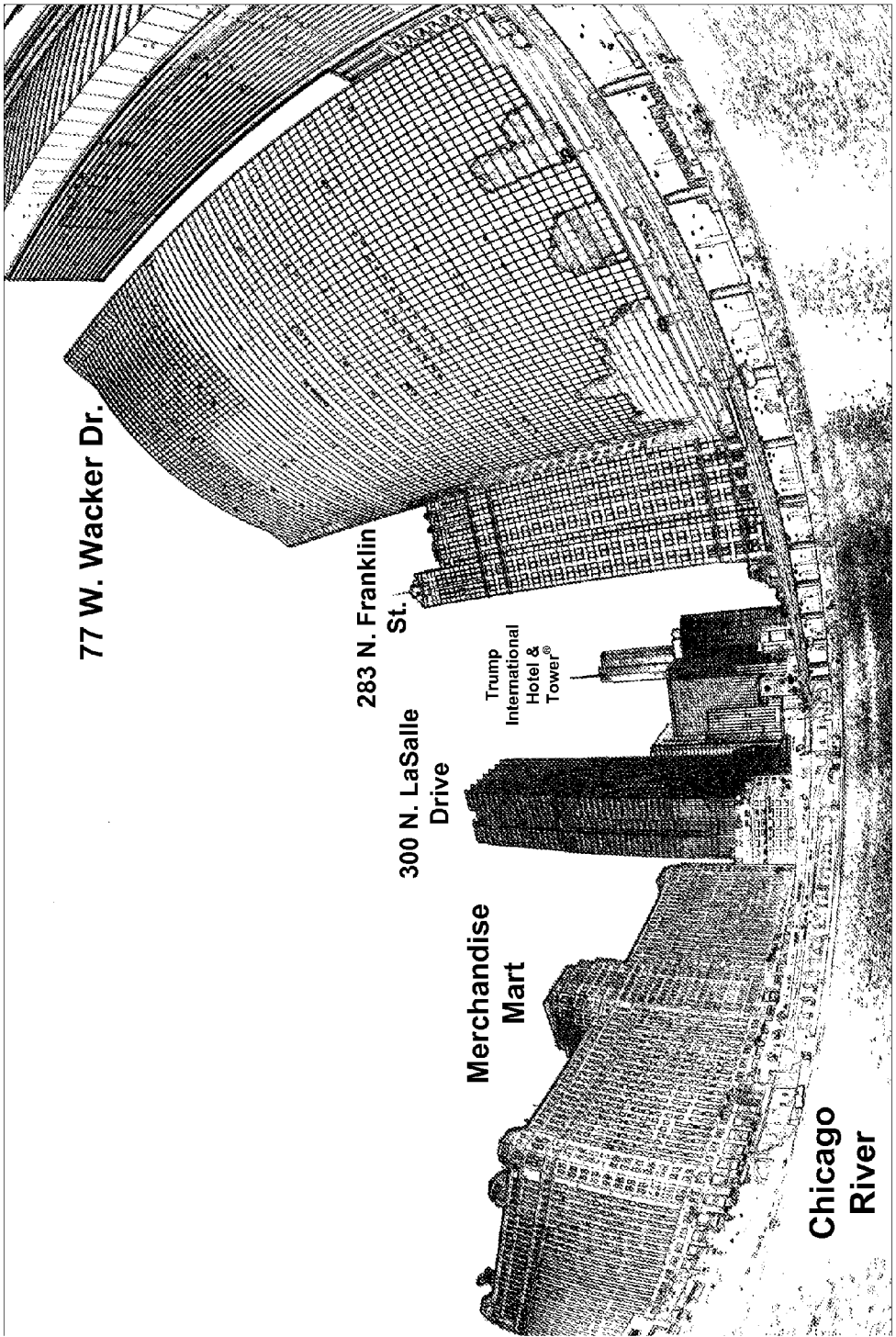
FIG. 2B is an image of a scene as it may be perceived by the user of a wearable computer that includes a head-mounted display.

FIG. 2B is an image of a scene as it may be perceived by the user of a wearable computer that includes an HMD. In particular, this type of view may be provided by an HMD of wearable computing device 200. In this example, the user is viewing a city scene through the HMD, and wearable computing device 200 has displayed "labels" for buildings (e.g., Merchandise Mart, 300 N. LaSalle Drive, Trump International Hotel and Tower®, 283 N. Franklin St., and 77 W. Wacker Dr.) and a label for a landmark (e.g., Chicago River) on the HMD. As shown, these labels are located near the buildings and landmark that they respectively identify, so that the user is informed of the associated building/landmark name and/or address.

Furthermore, the text of the labels shown in FIG. 2B is sized according to the distance between the building and the user. For example, the text size for the "Chicago River" label is the largest since it is closest to the user, while the text size of the "Trump International Hotel and Tower®" is the smallest, as it is furthest from the user. Varying label sizing as such may help create the perception that labels for closer buildings are closer as well, while labels for buildings that are further away are also further away. It should be understood that this is just one example of the type of processing that may be incorporated to provide an augmented-reality experience, and is by no means limiting as it is provided for explanatory purposes only.

FIG. 2C is a simplified block diagram showing components of an example wearable computing device in greater detail. As shown, wearable computer 200 includes an on-board computing system 204 that includes at least one processor 256 and system memory 258. In an example embodiment, on-board computing system 204 may include a system bus 264 that communicatively connects processor 256 and system memory 258, as well as other components of wearable computing device 200. Depending on the desired configuration, processor 256 can be of any type of processor including but not limited to a microprocessor (µP), a microcontroller (µC), a digital signal processor (DSP), or any combination thereof. Furthermore, system memory 258 can be of any type of memory including but not limited to volatile memory (such as RAM), non-volatile memory (such as ROM, flash memory, etc.) or any combination thereof.

An example on-board computing system 204 may include various other components as well. For example, on-board computing system 204 includes a video camera interface 252 for connecting to video camera 206, a graphics processing unit 254 for controlling HMD 202 (via an A/V port 255), one or more communication interfaces 268 for connecting to other computing devices 272, one or more UI interfaces 260 compatible with one or more external UI devices 261, and a power supply 262.

Furthermore, an example wearable computing device 200 may also include one or more data storage devices 266, which can be removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by wearable computing device 200.

According to an example embodiment, on-board computing system 204 includes program instructions that are stored in system memory 258 (and/or possibly in another data-storage medium) and executable by processor 256 to facilitate the functionality of wearable computing device 200 described herein. Therefore, in an example embodiment, on-board computing system 204 may include program instructions 270 for performing optical-flow analysis to determine the optical flow of video captured by video camera 206. As is understood by those skilled in the art, the "optical flow" of a video is the apparent motion of objects in the video that results from the relative movement between the object and the video camera.

Furthermore, wearable computing device 200 may use optical-flow analysis to provide a user with the ability to select an object within their view by performing a predetermined user-action. In particular, on-board computing system 204 may be configured to recognize when the optical flow of the video captured by video camera 206 has certain characteristics associated with a predefined user-movement, and to identify an object that the user has selected based upon these characteristics of the optical flow.

For example, the wearable computing device 200 may analyze optical flow of a point-of-view video from video camera 206, and detect when an area in the video frame has a localized optical flow of significantly different magnitude from the magnitude of the optical flow elsewhere in the frame. When the magnitude of optical flow in a certain area in the video frame differs significantly from the magnitude elsewhere in the video frame, it may be said that there is an "optical-flow differential" in this area of the video. The wearable computing device 200 may accordingly identify an object that is located at an area of optical-flow differential as having been selected by the user.

Many techniques for determining optical flow are well known to those skilled in the art. Such techniques include (i) phase correlation, (ii) block-based methods, (iii) differential methods such as the Lucas-Kanade optical flow method, the Horn-Schunk method, the Buxton-Buxton method, and the Black Jepson method, and (iv) discrete optimization methods, among others. In an example embodiment, on-board computing system 210 may implement the Lucas-Kanade method, which is typically less sensitive to noise in video, and thus may be particularly suited for determining optical flow between frames in a digitally-captured video. However, it is possible that an example embodiment may employ any appropriate technique for determining optical flow, including but not limited to any of the above-mentioned techniques.

To determine optical flow at a given point in time, the on-board computing system 204 may apply the Lucas-Kanade method or any other appropriate technique to compare the optical flow between two video frames from video camera 206. In an example embodiment, the determined optical flow may take the form of optical-flow data that is stored in a storage device 266. For a given optical-flow determination, the resulting optical-flow data may include a set of sample points that are identified by their coordinates within the video frame, and for each sample point, data indicating the magnitude and direction of the corresponding optical-flow vector at the sample point. Visually, the optical flow determined by on-board computing system 204 may be two-dimensionally represented as an "optical-flow field," which shows the set of sample points within the video frame and the optical-flow vectors that indicate the respective optical flow at each sample point.

In a further aspect, a wearable computer may include a second camera, or possibly even three or more cameras. For example, a wearable computer may include a camera mounted on each side of the user's head and/or one or more cameras mounted on the user's forehead (e.g., in between the user's eyes). The wearable computer may then use the video streams from the all the video cameras to determine when an optical-flow differential exists. For instance, provided with the additional optical-flow data from a second camera, the wearable computer may be able to more-accurately and/or more-quickly determine when an optical-flow differential exists. Accordingly, a wearable computer according to an example embodiment method may be further configured to receive video from a second video camera, to determine the optical flow of the video from the second camera, and to determine if an optical-flow differential exists in the second video.

When two cameras are used, and an optical-flow differential is detected in the video from both at substantially the same time, this reinforces that the determination that an optical-flow differential exists is accurate. However, when there is inconsistency between the video from the two cameras, the inconsistency may be resolved as a matter of design choice. For instance, when an optical-flow differential is detected in one camera but not the other, the HMD may be configured to conclude that an optical-flow differential exists and proceed accordingly based on the video in which the differential was detected. Alternatively, the HMD may resolve an inconsistency by assuming that there was an error, and as such may only conclude that an optical-flow differential exists, when a differential exists in both videos.

III. Overview of Optical-Flow Fields

Figure 3:
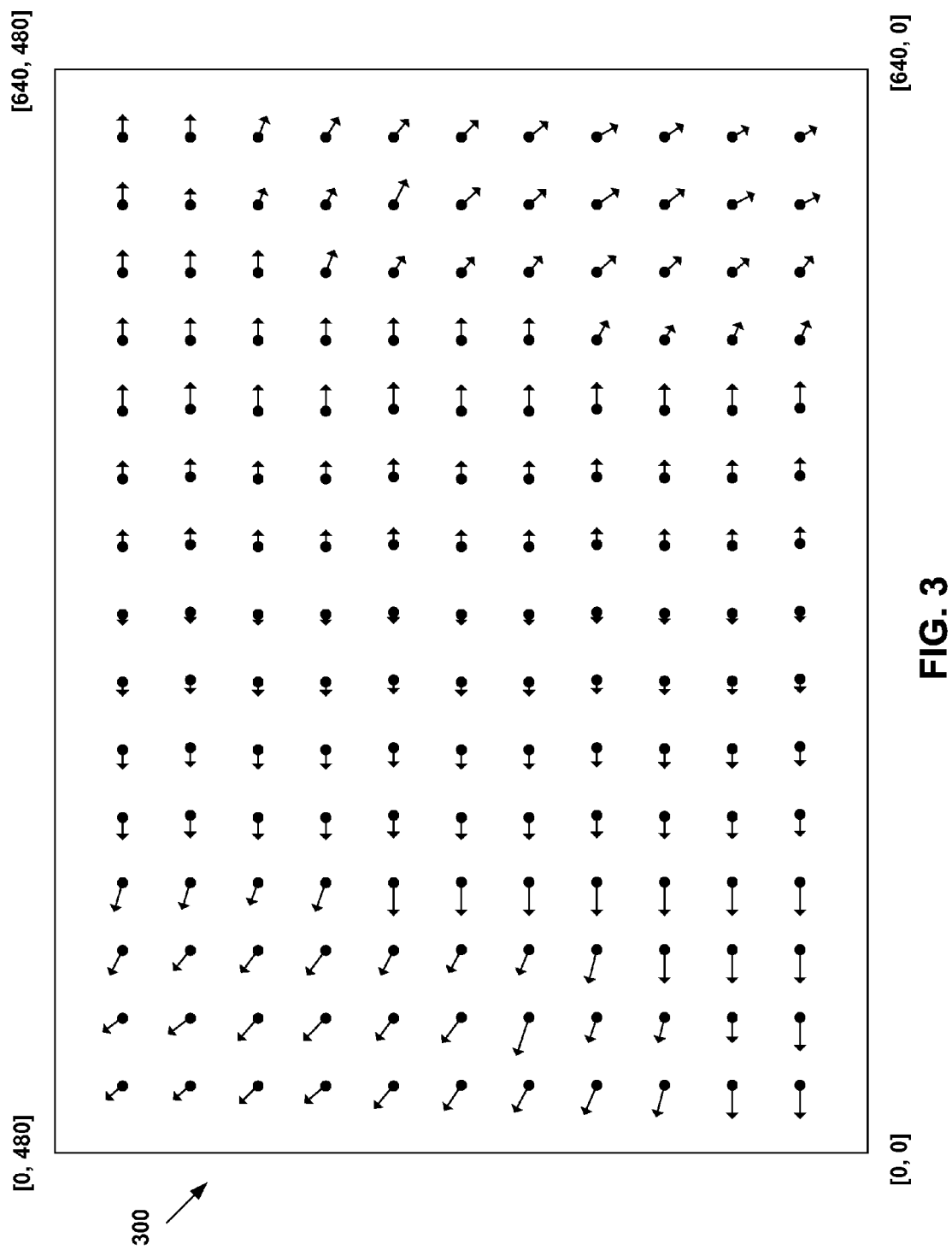
FIG. 3 is an illustration of an example optical-flow field.

FIG. 3 is an illustration of an example optical-flow field. As shown, optical-flow field 300 includes sample points throughout the frame, with an optical-flow vector that corresponds to each sample point indicating the magnitude and direction of the optical flow that is determined at the sample point.

Generally, each sample point in optical-flow field 300 corresponds to a certain pixel in the video frame from which the optical flow is derived. Therefore, the range of coordinate values for the samples points may be defined by the resolution of the video for which the optical flow is being determined. For instance, the example optical-flow field 300 provides the optical flow for video with a resolution of 640 pixels by 480 pixels ("640×480"). As such, each sample point in optical-flow field 300 may be identified by its respective coordinates within the 640×480 video frame. In the illustrated example, for instance, the sample points are arranged in an 11×15 grid, with coordinates ranging from [40, 40] at sample point A in the lower left corner, to [600, 440] in the upper right corner.

It should be understood that the number and arrangement of sample points in an optical flow field may vary as a matter of engineering design choice. For example, while an example wearable computer 200 may be configured to determine optical flow for the same number of sample points as shown in optical-flow field 300, the number of sample points may be increased to help increase the accuracy of the optical flow. Furthermore, while sample points in optical-flow field 300 are shown as being arranged in grid and spaced by 40 pixels, optical flow fields the arrangement and spacing of sample points for which optical flow is determined may vary as a matter of engineering design choice. Yet further, the number of points for which an optical-flow vector is determined may vary depending on the particular technique for determining optical flow that is employed.

Referring back to FIG. 2C, an example on-board computing system 204 may be configured to receive a live video feed from video camera 206, and to continually update and analyze the optical flow as frames of the video feed are received. As such, the on-board computing system 204 can continually monitor the optical flow for the occurrence of optical flow that is characteristic of a predetermined user-movement. Continual optical-flow analysis may be beneficial when the predetermined user-action indicates the selection of a certain object within the user's view for a search by the wearable computing device 200, as it may allow for automatic and substantially instantaneous (e.g., "real-time") display of search results in display 202.

It should be understood, however, that the optical flow may alternatively be updated periodically or intermittently. Furthermore, it is also possible that the optical flow may be determined in response to an indication from the user to do so. For example, optical-flow analysis may be disabled by default, and only enabled when the user indicates that it would like to be provided with search functionality, or would like optical-flow analysis to be enabled for another reason.

IV. Example Optical-Flow Fields Corresponding to Predetermined User-Actions

B. Movement in Curved Path around an Object

Figure 4A:
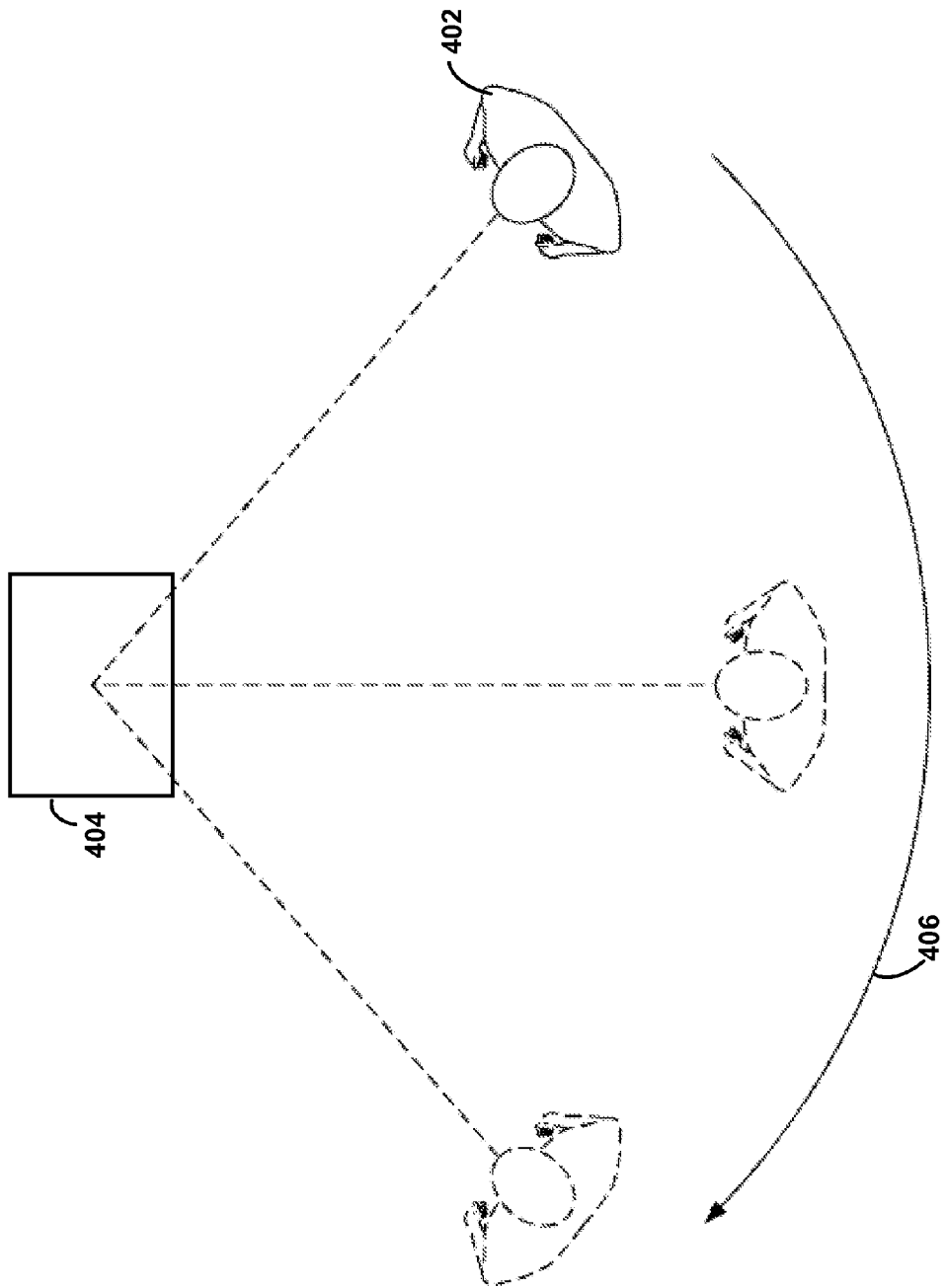
FIG. 4A is an illustration of a predetermined user-action with that an example method may recognize as selection of a particular object within a user's view.

FIG. 4A is an illustration of a predetermined user-action that an example method may recognize as selecting a particular object within a user's field of view. According to an example embodiment, the predetermined user-action is such that video captured by a point-of-view video camera during the movement has a characteristic optical flow, which includes an optical-flow differential at and/or around the object that the user selects via the user-action.

The user-action illustrated by FIG. 4A involves the user 402 initially focusing on an object 404. The user 402 then moves along a substantially circular path 406, keeping the object 404 in the same location within the user's frame of reference as the user moves along path 406. The movement of user 402 around object 404 may be accomplished by the user in various ways. For example, the user 402 may simply walk around the object 404 while keeping the object in the center of their frame of reference. As another example, the user 402 may remain standing in substantially the same place, but move their head in a circular motion around object 404 while substantially keeping the object in the center of their field of view (or substantially in a fixed position within their field of view). Other examples are also possible.

When object 404 remains in substantially the same position within the user's field of view as the user 402 moves along path 406, the apparent movement of the object 404 (or more particularly, the apparent movement of the pixels in the area where object 404 is located in the video frame) will be significantly less than the apparent movement elsewhere in the frame. Therefore, the optical-flow vectors in the area of the object will, on average, have a lesser magnitude than optical-flow vectors elsewhere in the frame, thus creating an optical-flow differential in the area that includes the selected object. Accordingly, when the wearable computer detects that such an optical-flow differential exists in a certain area, the wearable computer may responsively determine which object is in that area, and identify that object as being selected by the user.

In a further aspect, when the user 402 moves in a substantially circular path 406, the resulting optical flow field of a video captured by a point-of-view video camera may have a distinctive rotational characteristic. In particular, the optical-flow field outside the area of the selected object may exhibit a curvature pattern that corresponds to the user moving in the curved path 406 around the object 404. In some embodiments, a wearable computer may only determine that a particular object has been selected when both (i) an optical-flow differential exists in an area of the object and (ii) the optical flow outside the area of the object has a curvature that is characteristic of rotation around the object.

Figure 4B:
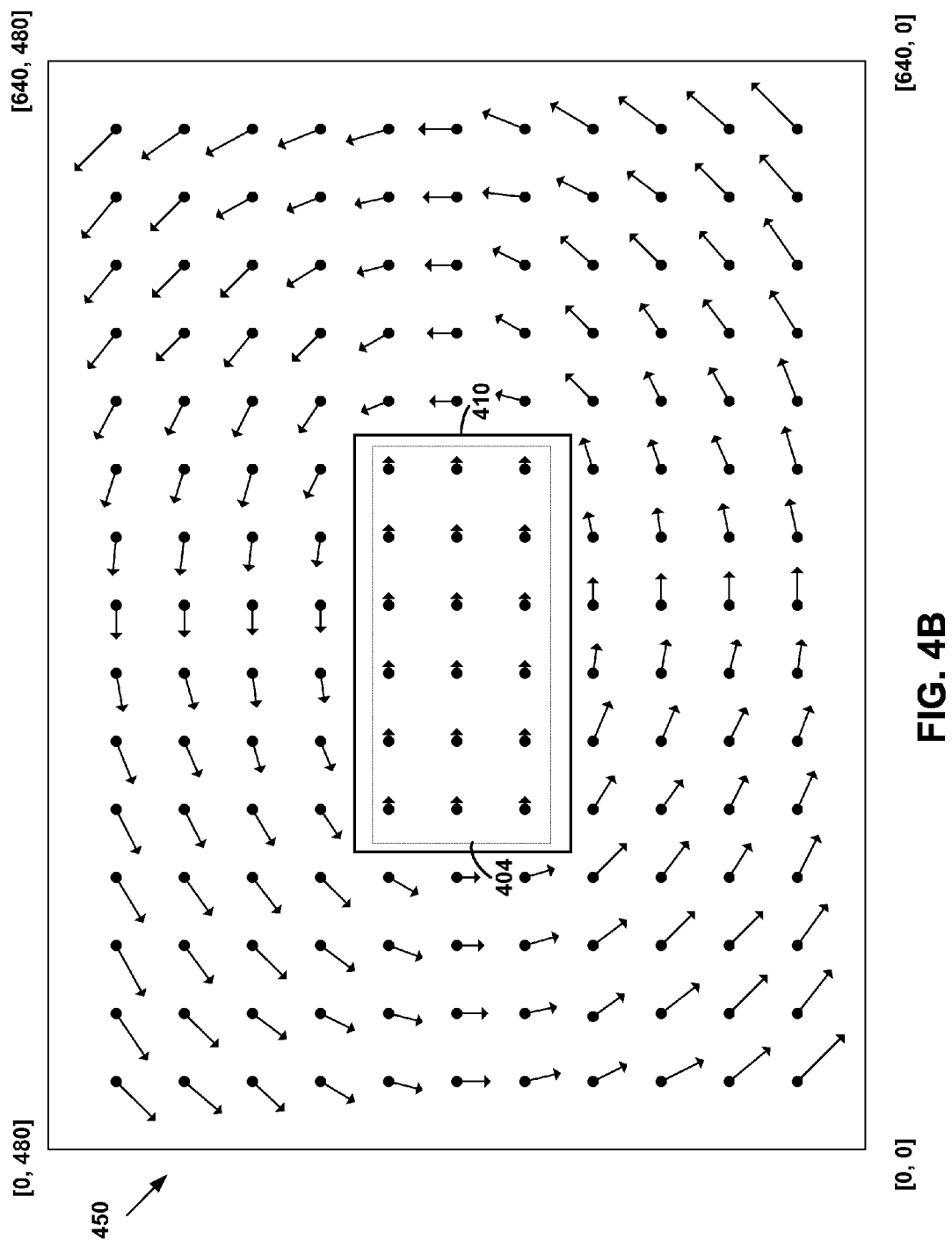
FIG. 4B is an illustration of an example optical-flow field that corresponds to the user-action illustrated by FIG. 4A.

FIG. 4B is an illustration of an example optical-flow field that corresponds to the user-action illustrated by FIG. 4A. In particular, FIG. 4B shows an optical-flow field 450 in which the optical-flow vectors within the general area 410 corresponding to object 404 are generally of a lesser magnitude than the optical-flow vectors outside of the area 410 corresponding to object 404. Further, the portion of the optical-flow field 450 that is outside of area 410 exhibits a curvature pattern that corresponds to the user moving around the object 404 along a curved path, such as path 406. For one or both of these reasons, a wearable computer analyzing optical-flow field may determine that an optical-flow differential exists in the area 410 corresponding to object 404. (Note that object 404 is shown from a front-on view in FIG. 4B, rather than the top down view of object 404 that is shown in FIG. 4A.)

As noted, the portion of optical-flow field 450 that is outside of area 410 exhibits a curvature that is characteristic of a user rotating around an object while keeping the object in substantially the same position within their field of view. In particular, as the user rotates in a counter-clockwise manner around object 404, pixels that represent the foreground in the user's field of view (e.g., pixels in the rectangular area defined by [0, 0] and [640, 220] and outside of area 410) have a left-to-right component to their apparent motion, while pixels that represent the background in the user's field of view (e.g., pixels in the rectangular area defined by [0, 260] and [640, 480] and outside of area 410) have a right-to-left component to their apparent motion. Further, the pixels that represent the left of the user's field of view (both in the foreground and in the background) have a downward component to their apparent motion. The pixels that represent the right of the user's field of view, on the other hand, have a downward component to their apparent motion.

As such, when the user moves in a curved path around object 404, the resulting point-of view video has an optical-flow field 450 that demonstrates apparent movement in the following general manner: upwards and to the left in the upper right of the video frame (e.g., towards [640, 480]), downward and to the left in the upper left of the video frame (e.g., towards [0, 480]), downward and to the right in the lower left of the video frame (e.g., towards [0, 0]), and upwards and to the right in the lower right of the video frame (e.g., towards [640, 0]). Further, the angles of the optical-flow vectors in optical-flow field 450 (in the area outside of area 410) are such that optical-flow field 450 exhibits the general curvature shown in FIG. 4B. This general curvature is characteristic of a point-of-view video that captures a user-action such that shown in FIG. 4A.

B. Fixation on a Rotating Object

Figure 5A:
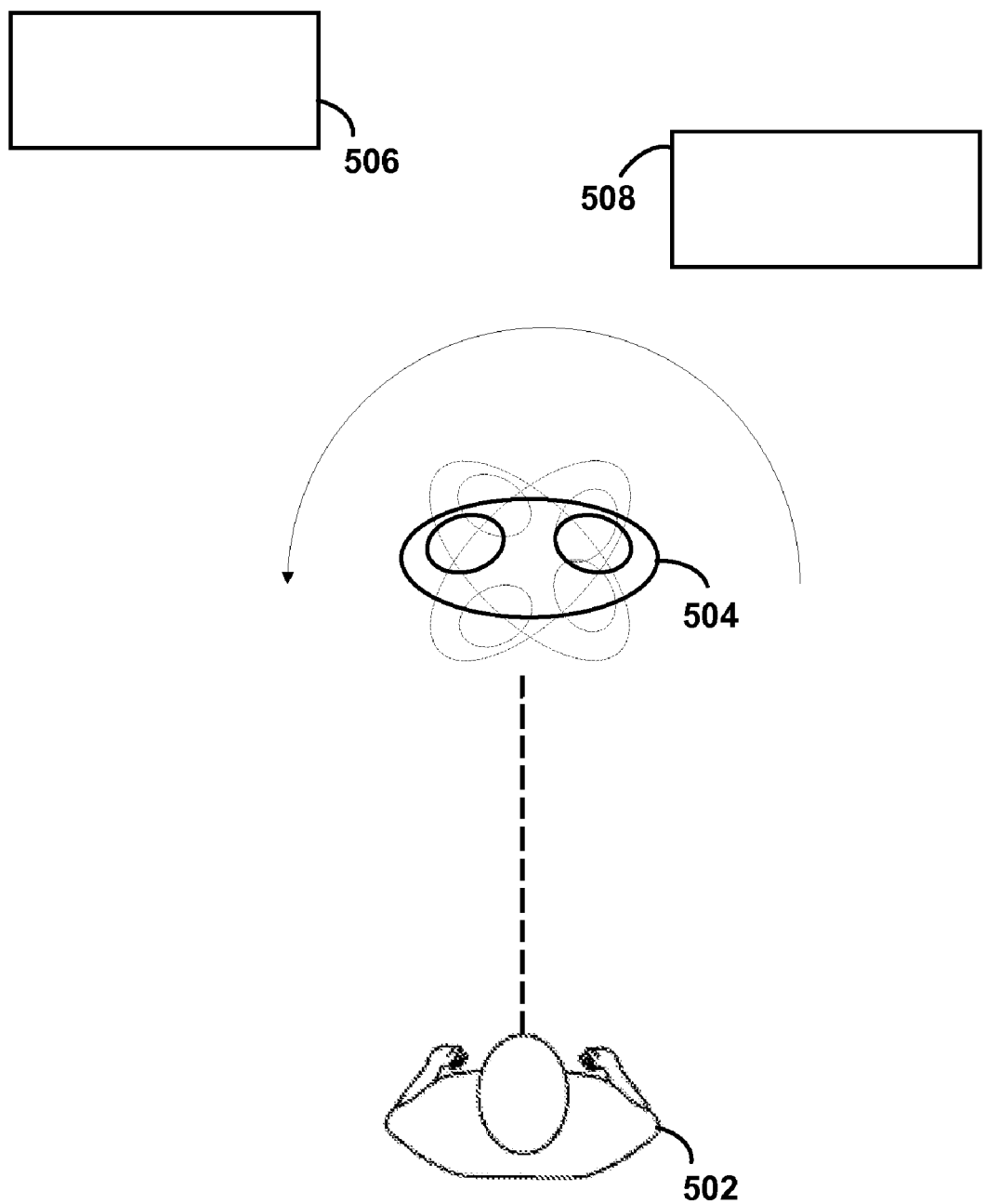
FIG. 5A is another illustration of a predetermined user-action with that an example method may recognize as selection of a particular object within a user's view.

FIG. 5A is another illustration of a predetermined user-action that, according to an example embodiment, may be recognized as the selection of a particular object. In particular, the user-action shown in FIG. 5A may be used to select a moving object such as object 504, which is rotating within the user's field of view, while the user remains in substantially the same position.

In particular, when the user 502 remains in substantially the same place and remains substantially fixated on object 504, then the rest of the frame, including non-moving objects 506 and 508, will have less apparent movement relative to the user than the rotating object 504. (In FIG. 5A, the optical-flow vectors in the rest of the frame are shown as having no magnitude, but this is not required.) Thus, in a point-of-view video corresponding to the user-action illustrated by FIG. 5A, the optical-flow vectors in the area at and/or around the rotating object 504 will, on average, have a much greater magnitude than optical-flow vectors elsewhere in the video frame. This creates an optical-flow differential in the area of the video that includes the selected object. Further, the optical flow of such a point-of-view video may exhibit a general curvature in the area of the object 504, which is characteristic of an object rotating while the user fixates on the object without substantial movement. As such, the difference in magnitude and/or the curvature in the area of object 504 may be used to identify an optical-flow differential at the area of object 504.

The predetermined user-action illustrated by FIG. 5A may be particularly useful for smaller and/or lightweight objects, which a user can pick up with their hands. In particular, the user may initiate a search by holding such an object within their field of view and rotating the object while remaining fixated on it. This user-action may also be achieved by fixating on an object that rotates on its own, such as a carousel, for instance. It should be understood, however, that this user-action is not limited to any particular use or to use on any particular type of object.

Figure 5B:
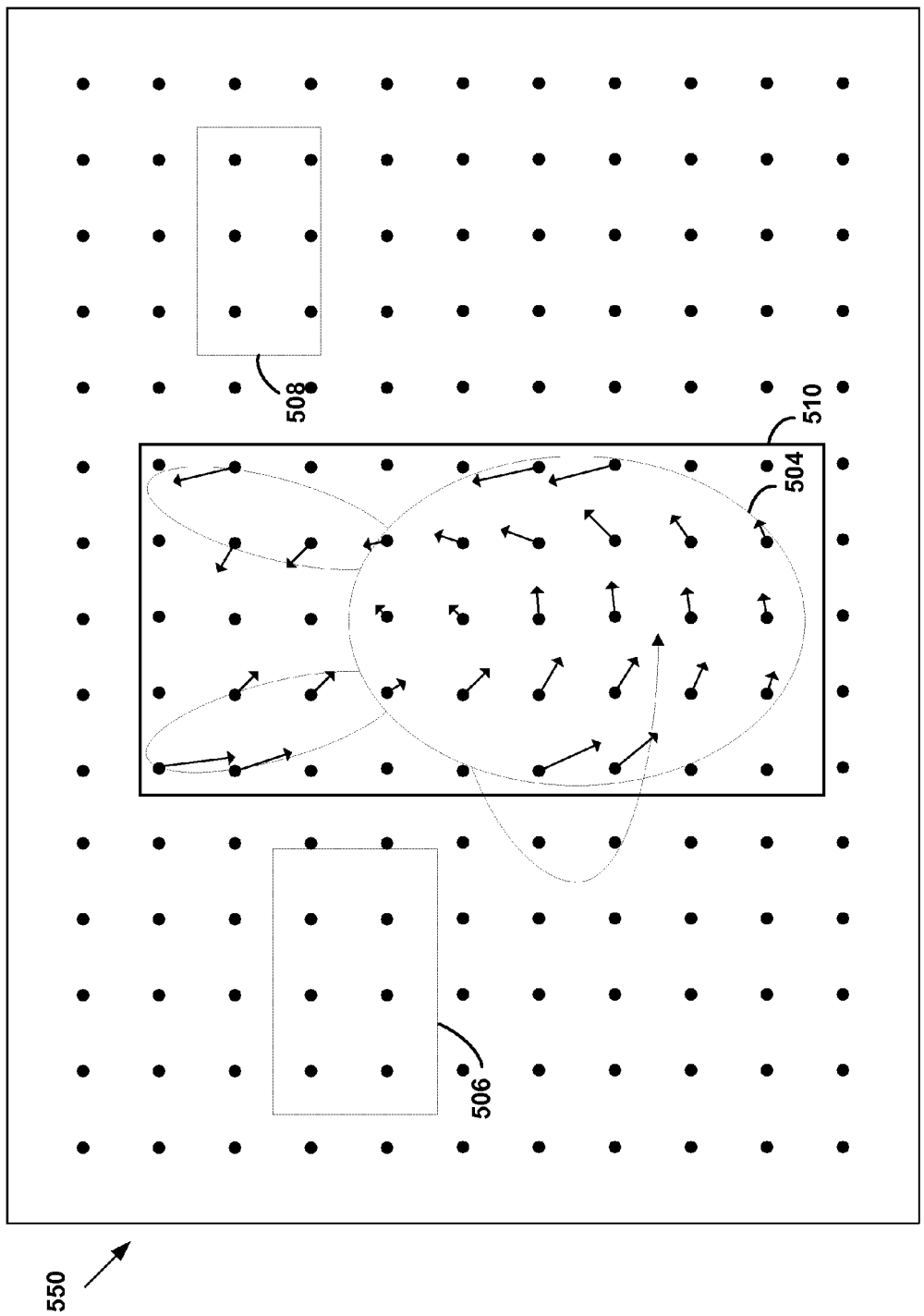
FIG. 5B is an illustration of an example optical-flow field that corresponds to the user-action illustrated by FIG. 5A.

FIG. 5B is an illustration of an example optical-flow field that corresponds to the user-action illustrated by FIG. 5A. In particular, FIG. 5B shows an optical-flow field 550, in which the optical-flow vectors within area 552 are generally of greater magnitude than the optical-flow vectors outside of area 552. As such, it may be determined that area 552 is an optical-flow differential. (Note that objects 504-508 are shown from front-on views in FIG. 5B, rather than the top-down views shown in FIG. 5A.)

In a further aspect illustrated by FIG. 5B, the optical flow that results from the rotation of object 504 has a curvature that is characteristic of a user remaining in one place and fixating on a rotating object. For example, as the object 504 rotates in a counter-clockwise manner, pixels on the left of the video have an apparent motion that is downward and to the right, while pixels on the right of the video have an apparent motion that is upward and to the left.

IV. Exemplary Methods

Exemplary methods may generally involve a computing device analyzing optical flow from a video, such as a point-of-view video, and determining when the optical flow corresponds to a predetermined user-action for selecting an object, such as the user-actions illustrated in FIGS. 4A and 5A. Analysis of the optical flow may also identify the particular object in the video that is being selected, so that an action can be taken on the object. As such exemplary methods involve taking an action elated to the selected object such as performing a search on the selected object or providing a 3D reconstruction of the selected object, among others.

Herein, exemplary methods may be described by way of example as being carried out by a wearable computer having an HMD (e.g., by an on-board computing system of such a wearable computer). However, it should be understood that an example method may be carried out by any type of wearable computer, by multiple components of a wearable computer, by one or more other entities in communication with a wearable computer via a network (e.g., in conjunction with or with the assistance of an augmented-reality server), or by a wearable computer in combination with one or more other entities. Furthermore, it is possible that an example method may be carried out on a device other than a wearable computer. For example, an example method may be carried out by a video camera or a mobile phone equipped with a video camera. Implementations on other devices are also possible.

Figure 6:
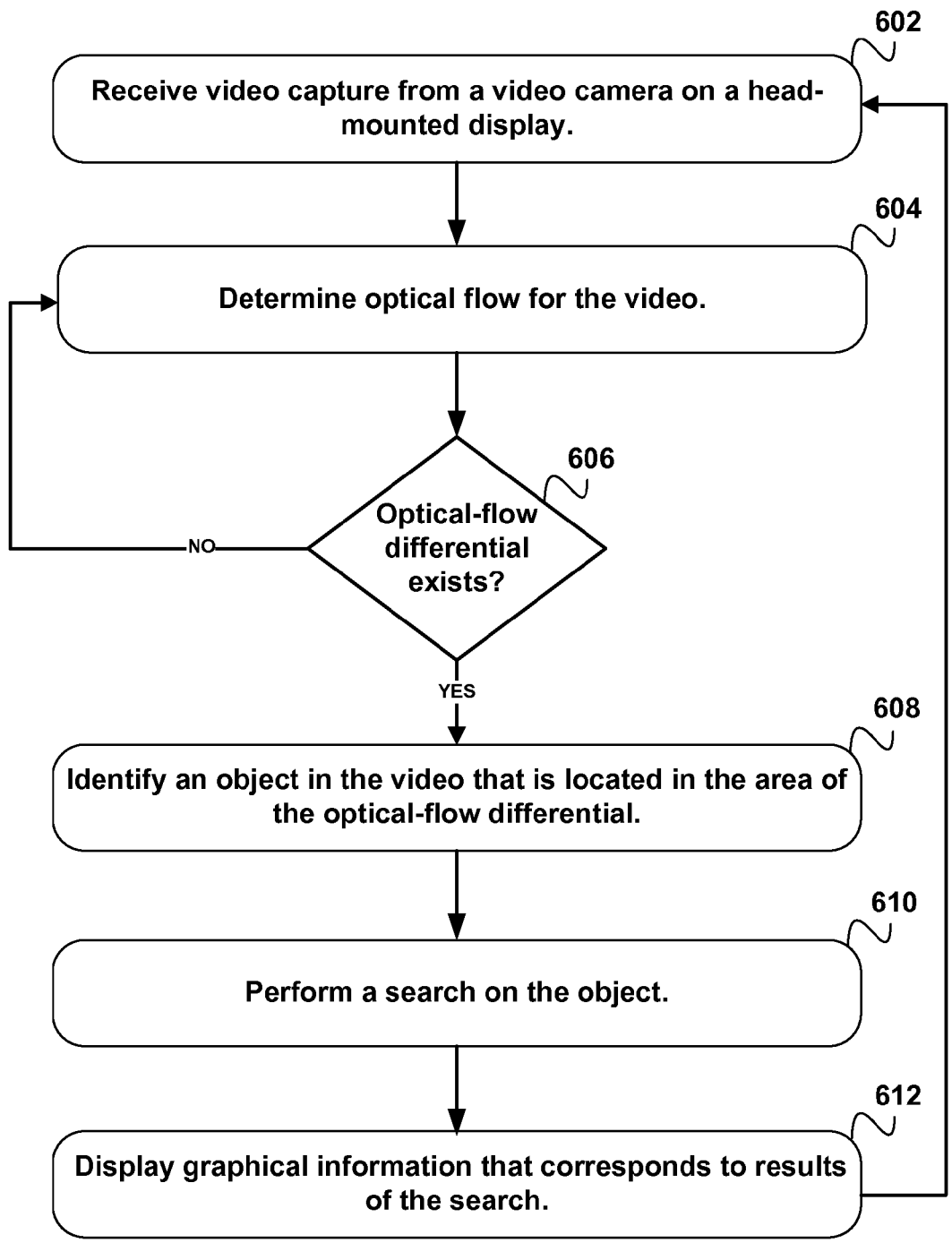
FIG. 6 is a flow chart illustrating a method according to an example embodiment.

FIG. 6 is a flow chart illustrating a method according to an example embodiment. Method 600 is described by way of example as being carried out by a wearable computer having an HMD (e.g., by an on-board computing system of such a wearable computer). Method 600 is an example of an embodiment in which a wearable computer identifies a user-selected object and responsively performs a search on this object.

More specifically, example method 600 involves an on-board computing system of a wearable computer receiving video from a video camera on the HMD, as shown by block 602. The system then determines optical flow for the video, as shown by block 604. In an example embodiment, the system is continually determining and analyzing the optical flow of video captured by the video camera. As such, the system may determine when an optical-flow differential exists at an area in the video, as shown by block 606. In response to determining that an optical-flow differential exists, the system then identifies an object in the video that is substantially located in the area of the optical-flow differential, as shown by block 608. The system then performs a search on the object, as shown by block 610, and causes a display of the system to display graphical information that corresponds to the results of the search, as shown by block 612.

A. Detecting an Optical-Flow Differential

According to an example method, the system analyzes the optical flow of the video for an optical-flow differential that corresponds to a predetermined user-action that produces visual isolation of the object in the video, such as those illustrated by FIGS. 4A and 5A. A user may achieve visual isolation of a selected object through an action in which the selected object undergoes significantly more or less apparent motion within the user's frame of reference. When a wearable computer includes a point-of-view video camera that generally follows the movements of the user's head, such visual isolation by the user results in an optical flow at the location of a selected object that differs significantly from the optical flow elsewhere in the video.

For example, the system may analyze the optical flow in order to detect when an optical-flow differential exists that is characteristic of the user fixating on an object during rotational movement around the object, such as that which exists in FIG. 4B. To do so, the system may determine that optical-flow vectors within a certain area or region of the video are, on average, of substantially lesser magnitude than optical-flow vectors elsewhere in the video (e.g., outside of this area). In particular, the system may first determine a threshold magnitude such that the magnitude for a predetermined percentage of the optical-flow vectors is less than the threshold magnitude. The system may then determine which optical-flow vectors have a magnitude less than the threshold magnitude, and determine an area in the video that includes at least a predetermined percentage of the optical-flow vectors that have a magnitude less than the threshold magnitude.

In some embodiments, the identification of the area where an optical-flow differential exists may further involve determining that the optical-flow field has curvature characteristics that are associated with a predetermined user-action. For example, when the optical-flow field includes an area of significantly greater magnitude than elsewhere in the optical-flow field, then the wearable computer may further consider whether the optical flow outside this area has a curvature that is characteristic of a user rotating around an object at this area. If this characteristic curvature is detected, then the wearable computer concludes that an optical-flow differential exists at this area. Otherwise, the wearable computer may conclude that due to the lack of the characteristic curvature (and despite the significant difference in magnitude) there is not an optical-flow differential. A specific example of an optical-flow field that does include this type of optical-flow field is illustrated by FIG. 4B. More specifically, a wearable computer may conclude that an optical-flow differential exists at area 410 of optical-flow field 450, because both: (i) the optical flow in area 410 differs significantly in magnitude from elsewhere in optical-flow field 450 and (ii) the optical flow outside of area 410 has a curvature that is characteristic of the user rotating around an object shown in the video at area 410.

In a further aspect, the on-board computing system may additionally or alternatively detect when an optical-flow differential exists that is characteristic of a predetermined user-action such as that illustrated by FIG. 5A, in which the user remains in substantially the same location and fixates on an object while the object is rotating. In particular, once the system has determined the optical flow at a given point in time, the system may determine that optical-flow vectors within a certain area of the video are of substantially greater magnitudes than optical-flow vectors elsewhere in the video (e.g., outside of the area). This determination may involve the HMD first determining a threshold magnitude such that the magnitude for a predetermined percentage of the optical-flow vectors is less than the threshold magnitude. The HMD may then determine which optical-flow vectors have a magnitude greater than the threshold magnitude, and determine whether there is an area that includes at least a predetermined percentage of the optical-flow vectors that have a magnitude greater than the threshold magnitude.

In some embodiments, the wearable computer may further condition the identification of an optical-flow differential on the existence of characteristic curvature in the area of an optical-flow field having a greater magnitude than elsewhere. FIG. 5B illustrates an optical-flow field 550 where such an optical-flow differential exists. As such, when it is determined that area 510, on average, is of significantly greater magnitude, then the optical flow in area 510 may be analyzed for curvature that is characteristic of a rotating object. Since, in this case, the characteristic curvature is present, the wearable computer may conclude that an optical-flow differential exists at area 510.

In a further aspect, the determination of the threshold magnitude may involve the system generating a magnitude distribution of the optical-flow vectors from the determined optical flow. This distribution may then be analyzed to determine the magnitude at which the predetermined percentage of the optical-flow vectors have a lesser magnitude. This magnitude may then be set as the threshold magnitude.

Figure 7:
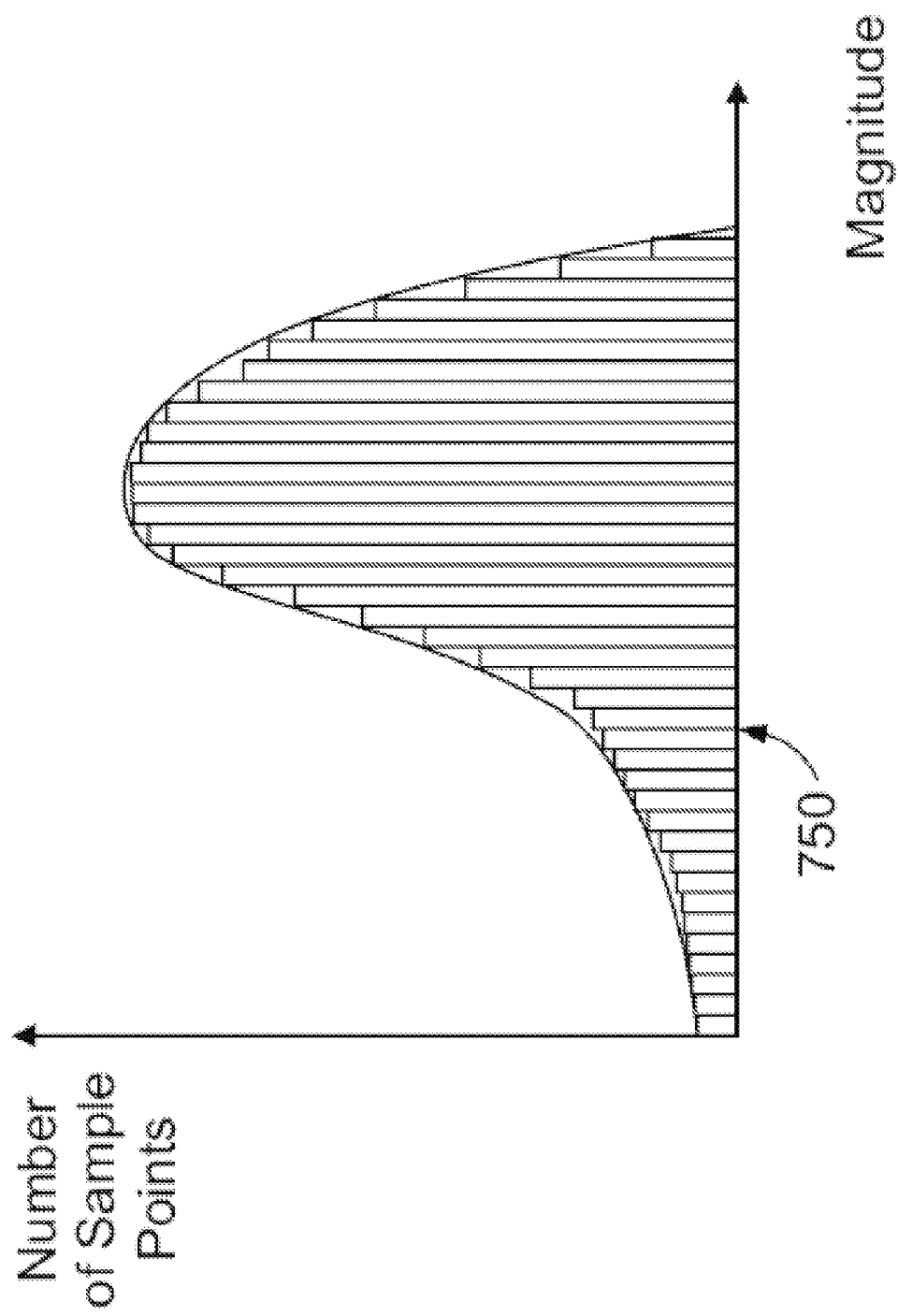
FIG. 7 is a histogram showing a distribution of the optical-flow vectors from optical flow field having an optical flow differential similar to that shown in FIG. 4B.

For example, FIG. 7 is a histogram showing a distribution of the optical-flow vectors from optical flow field having an optical flow differential similar to that shown in FIG. 4B. Consider, in this example, an embodiment where the HMD sets the threshold magnitude equal to the magnitude at which 25% of the optical-flow vectors have a lesser magnitude. As shown in the histogram by threshold magnitude 750, 25% of the optical-flow vectors from the optical-flow field have a magnitude that is less than threshold magnitude 750. (Note that FIG. 7 is for illustrative purposes and thus is not intended to be mathematically accurate.) Note that the percentage of 25% is provided only as an example, and that the predetermined percentage used to determine the threshold magnitude may vary as a matter of engineering design choice.

The on-board computing system may then evaluate the locations (i.e., pixel coordinates) of those optical-flow vectors having a below-threshold magnitude (which may be referred to as "low-magnitude optical-flow vectors"), and determine if there is an area in the video in which a predetermined percentage of the low-magnitude optical-flow vectors are concentrated. A concentration of the low-magnitude optical-flow vectors in one area is an optical-flow differential that is typical of video captured when a user performs a predetermined user-action such as that shown in FIG. 4B.

Accordingly, when the on-board computing system detects the presence of a predetermined percentage of the low-magnitude optical-flow vectors in an area of a certain size, it may take this as an indication that an optical-flow differential exists in this area. For instance, the system may consider the concentration of 75% of the low-magnitude optical-flow vectors in an area of a predetermined size (e.g., a predetermined resolution) to be an optical-flow differential indicating that an object in that area is selected. Referring again to FIG. 4B as an example, the system may determine that 75% of the low-magnitude optical-flow vectors are within the area 410, and thus that an optical-flow differential exists at area 410.

Figure 8:
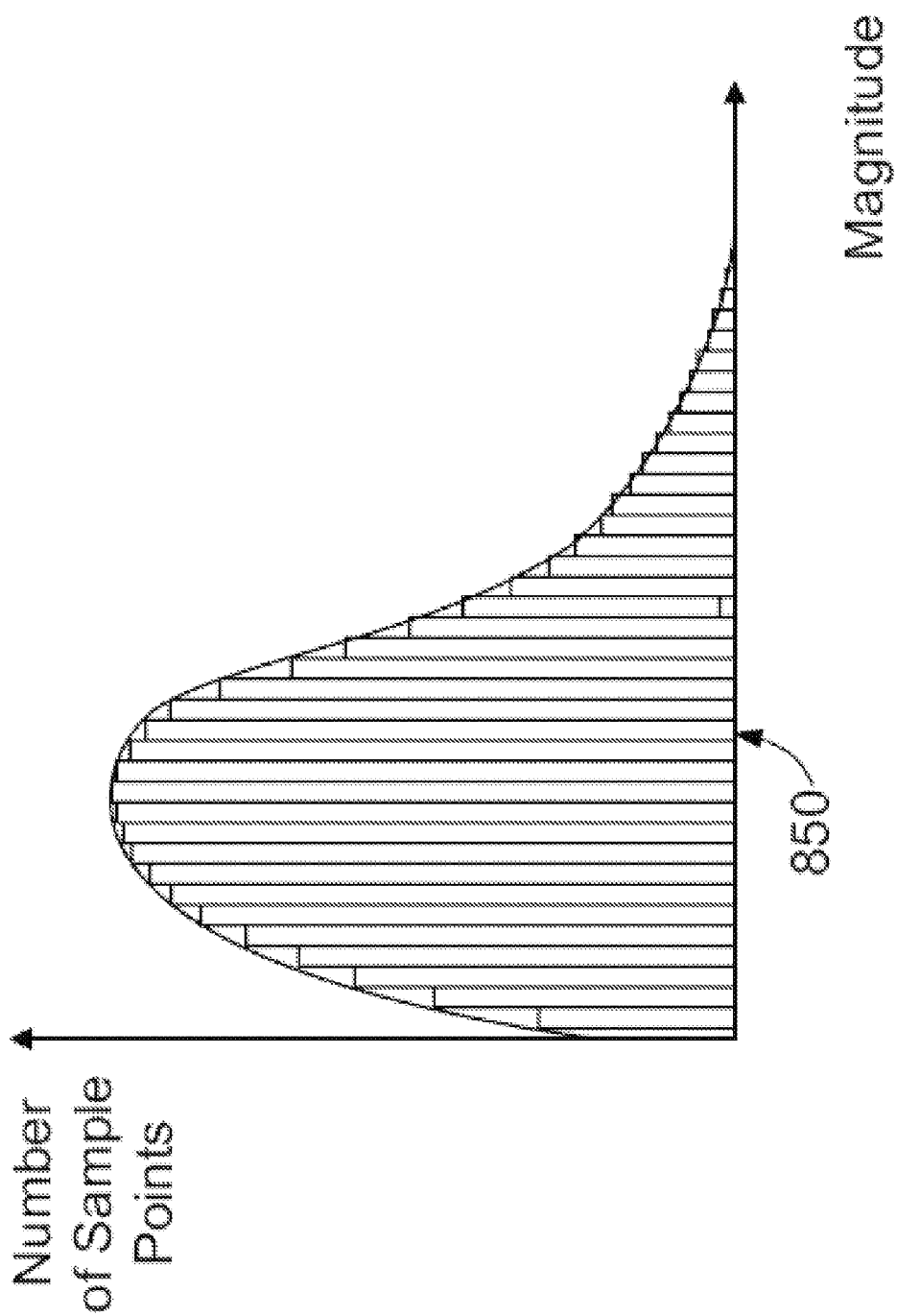
FIG. 8 is another histogram showing a distribution of the optical-flow vectors from optical flow field having an optical flow differential similar to that shown in FIG. 4B.

FIG. 8 is another histogram showing a distribution of the optical-flow vectors from optical flow field having an optical flow differential similar to that shown in FIG. 5B. Consider, as a specific example, an embodiment where the system sets the threshold magnitude equal to the magnitude at which 25% of the optical-flow vectors have a greater magnitude. As shown in the histogram by threshold magnitude 850, 25% of the optical-flow vectors from optical-flow field 800 have a magnitude that is greater than the threshold magnitude. (Note that FIG. 8 is for illustrative purposes and not intended to be mathematically accurate.) Note again that the percentage of 25% is provided only as an example, and that the predetermined percentage used to determine the threshold magnitude may vary as a matter of engineering design choice.

The on-board computing system may then evaluate the locations (i.e., pixel coordinates) of those optical-flow vectors having an above-threshold magnitude (which may be referred to as "high-magnitude optical-flow vectors"), and determine if there is an area in the video in which a predetermined percentage of the high-magnitude optical-flow vectors are concentrated. A concentration of the high-magnitude optical-flow vectors in one area is an optical-flow differential that is typical of video captured when a user performs a predetermined user-action such as that shown in FIG. 5A.

Accordingly, when an on-board computing system detects the presence of a predetermined percentage of high-magnitude optical-flow vectors in an area of a certain size, it may take this as an indication that an optical-flow differential exists at this area. For instance, an HMD may consider the concentration of 75% of the high-magnitude optical-flow vectors in an area of a predetermined size to be an optical-flow differential indicating that an object in that area is selected. Referring to FIG. 5B as an example, the HMD may determine that more than 75% of the high-magnitude optical-flow vectors are within the area 510, and thus that an optical-flow differential exists at area 510.

In some embodiments, an additional check may be performed to determine if the area of an optical-flow differential stays at substantially the same size for a predetermined period of time. For instance, a user may remain at approximately the same distance from an object as the user rotates around the object. In this scenario, the size of the object should remain substantially the same in the corresponding point-of-view video. As such the size of the optical flow differential should also remain substantially the same. Accordingly, once an optical-flow differential is identified, a wearable computer may then determine the size of the optical-flow differential, and only proceed to identify and/or take action on the object at the optical-flow differential when the size remains substantially the same for at least a predetermined period of time.

B. Identifying an Object in the Area of an Optical-Flow Differential

Once it is determined that an optical-flow differential exists at a certain area of the video, the HMD proceeds to identify the object that is located in the area. For example, since area 510 substantially includes object 504, the HMD may identify object 504 as the selected object. This function may be accomplished in various ways. For example, object-recognition techniques may be applied to the image to identify the objects in the picture, and the location of each object. In particular, the pixels making up the object may be identified. The object at the area of the optical-flow differential may then be identified by determining which object has pixels matching up with the pixel coordinates of the optical-flow differential.

Various criteria may be used to determine whether the pixels of a given object match the pixel coordinates of the optical-flow differential. For instance, the area of the optical-flow differential may be treated as defining a boundary that should substantially contain the selected object. As such, the HMD may determine whether a predetermined percentage of the pixels from the object are within a boundary formed by the area. For example, an object may be considered to be contained within a given area when at least 75% of the object is within the area (i.e., when at least 75% of the pixels making up the object are within the area). Other examples are possible, and may vary as a matter of engineering design choice.

Alternatively, the area of the optical-flow differential may be treated as a cursor that selects whatever object includes the majority of the pixels within the area of the optical-flow differential. In such an embodiment, the area of the optical-flow differential may be determined such that it is a smaller area. To do so, the percentage used to determine the threshold magnitude may be reduced to 5%, for example, so that the number of optical-flow vectors in the area of the differential is reduced, thus reducing the size of the area as well.

In a further aspect, to help make the process of recognizing the object more efficient, a Gaussian blur may be applied to the area in the frame outside the area of the optical-flow differential. Doing so may highlight the area with the object, simplifying the process of picking out the object from all the other information in the frame.

Other techniques may also be applied to help improve the image of the object, so that a search or other action on the object may be more accurate. For example, when an object is generally identified, super resolution could be performed on the image of the object from the video. As another example, sub-pixel resolution could also be performed on the image of the object. Techniques for both super resolution and sub-pixel resolution are well known to those skilled in the art, and thus are not discussed in further detail herein.

C. Taking Action on an Object in the Area of an Optical-Flow Differential

Referring again to method 600 of FIG. 6, once the object in the area of the optical-flow differential has been identified, a search may be performed on the object. Generally, any type of image-based search may be performed. For example, an image-based Internet search on the selected object may be performed using one of the many search techniques that are well known to those skilled in the art. The search may involve, for example, a search of an image database, a search based on text that is associated with the object, or another type of search altogether. Accordingly, the search results may include images, text, hyperlinks, and/or other types of media and/or other types of information.

Other actions may also be taken on the identified object. For example, the identified object may be highlighted or otherwise indicated to the user in the HMD before a search is performed on the object. The user may then be prompted to confirm that a search should be performed a search on the object. For example, a visual prompt may be displayed in the HMD. As another example, an auditory prompt may be played out via speakers of the wearable computer. The user may then respond by, for example, confirming that a search should be performed, by indicating that no search should be performed, and/or by indicating that some other action should be taken. In an alternative, the user may be prompted to confirm a non-search function that is related to the object. In such an embodiment, the non-search function may be performed upon receipt of confirmation from the user.

In a further aspect, a three-dimensional (3D) reconstruction and/or a 3D search may be performed for the selected object. As such, the wearable computer may use the video captured as the user rotates around the selected (or as the object itself rotates), to generate a 3D reconstruction of the object. Such video will typically provide a sequence of video frames that capture multiple views of the selected object as it rotates. Techniques for 3D reconstruction that are well known to those in the art may then be applied to generate a 3D reconstruction based on these video frames. Any of the 3D search techniques that are well known to those skilled in the art may then be applied in order to perform a 3D search on the 3D reconstruction of the selected object. Further, the wearable computer may be configured to perform the search itself, or to generate the 3D reconstruction and send it to another entity such as an AR server to perform the search, or to send the video to another entity that generates the 3D reconstruction therefrom and performs the search for the HMD.

In yet a further aspect, an example system may evaluate a 3D reconstruction as it is being created, and may provide feedback as to how the 3D reconstruction might be improved. In particular, a wearable computer may determine whether there is information that has not been captured in the video, which could improve the three-dimensional reconstruction. For instance, consider that a predetermined user-action of rotating around an object may generate video that includes a number of views of an object from different angles. However, it may be the case that additional views from different angles could improve the 3D reconstruction.

If it is determined that information that has not been captured might improve a 3D reconstruction, then the wearable computer may prompt the user to, for example, perform a user-action that is likely to capture, in the video, at least some of the information that could improve the 3D reconstruction. For example, the prompt may take the form of an arrow displayed in an HMD, which indicates a direction the user should rotate around a selected object, in order that additional views of the object can be captured in a point-of-view video. As another example, an arrow may be displayed that indicates that the selected object should be rotated in a certain direction. Note that in either case, the arrow may indicate that rotation should continue in the same direction, or may indicate that rotation should be reversed. Other types of prompts that provide other types of feedback or instructions to the user are also possible.

In a further aspect, an example system may be configured to differentiate between different types of optical-flow differentials. As such, an example system may associate different functions with the different types of optical-flow differentials. For instance, an example wearable computer may be configured to differentiate between a plurality of types of optical-flow differentials, which include at least a first type and a second type (e.g., an image search and a 3D search). As such, the wearable computer may determine which type of optical-flow differential exists at a given point in time, and responsively adjust the manner in which the search on the object is performed (e.g., by performing either an image search or a 3D search, depending upon the type of optical-flow differential).

To illustrate more specifically, in some embodiments the optical-flow differentials that are characteristic of rotation around an object in either direction may trigger the same action (e.g., a search). However, in other embodiments, the optical-flow differential associated with counterclockwise rotation around an object may be mapped to a first function (e.g., a basic object search), while the optical-flow differential associated with clockwise rotation may be mapped to a second function (e.g., a 3D reconstruction of the object).

Yet further, optical flow could be analyzed for sequential gestures, in order to provide a user with more granular control. For example, take the scenario where an optical-flow differential associated with rotation around an object has just been detected, and search results for the object have just been displayed. The user could then tilt their head while continuing to look at the object (and the corresponding optical flow detected) in order to select one of a variety of actions to perform on the object that has been searched. For example, once detecting optical flow characteristic of a tilt of the head in a first direction may launch a webpage associated with object, while detecting optical flow characteristic of a tilt in a second direction may save the image, and detecting optical flow characteristic of a tilt in a third direction may load the image in an email message. Many other gestures and functions are also possible.

Further, it is possible that information guiding the subsequent gestures may be displayed in order to assist the user. For example, arrows indicating the direction to tilt may be displayed, along with text indicating the function that is associated with a tilt in the given direction. Other examples are also possible.

D. Server Assistance in Example Methods

While the foregoing example methods have primarily been described as being carried out by a wearable computer (e.g., by an HMD), it should be understood that some or all of the described functionality may be carried out by a remote entity, such as an AR server. For example, an AR server may receive video from a wearable computer, determine when an optical-flow differential exists in an area of the video, identify the object in the area of the optical-flow differential, search the identified object, and then notify the wearable computer of the search results. As another example, the wearable computer may determine when an optical-flow differential exists, and then send optical-flow data and the corresponding video frames to the AR server, which uses the optical-flow data to identify which object is selected, and then performs an image-based search on the selected object. Other examples are also possible.

In some embodiments, the wearable computer may identify an object by requesting that a remote entity, such as an AR server, identify the object for the wearable computer. For example, when an example wearable computer determines that an optical-flow differential exists, the wearable computer may be configured to send the corresponding optical-flow data and the video frames from which the data was generated to a remote entity such as an AR server. The AR server may then apply object-recognition techniques to identify objects in the video frames, and identify which object is located at the optical-flow differential.

Alternatively, an example wearable computer may apply image processing techniques to isolate the selected object in the video frame, and then send the processed version of the video frame to an AR server for object identification and search. For example, if the optical-flow determination technique is configured such that the area of the differential substantially contains a selected object (e.g., when the area is treated as defining a border around the selected object), the wearable computer may apply image-processing techniques to highlight the area of the optical-flow differential. For instance, the wearable computer may blur out, remove, lighten, or otherwise highlight all areas of the video frame outside the area of the optical-flow differential. Since the area of the optical-flow differential substantially includes the selected object, highlighting this area may serve to isolate the selected object. Accordingly, doing so may isolate the selected object, so that the AR server need only identify what the object is.

Furthermore, it should be understood that in alternative embodiments, it is possible that example methods and systems may be incorporated in devices other than wearable computers. For example, those skilled in the art will understand that an example method may be implemented by other devices that have video recording capability, such as mobile phones and cameras (e.g., video cameras or still cameras with video capability).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving a video from a video camera of a wearable computing device;
determining optical flow for the video;
determining that an optical-flow differential exists at an area within the optical flow for the video wherein determining that the optical-flow differential exists comprises:
determining that optical flow within the area is of substantially different magnitude than optical flow outside of the area; and
determining that at least a portion of the optical flow for the video has a curvature that is characteristic of a predetermined user-action associated with selection of the object; and
responsive to determining that the optical-flow differential exists at the area within the optical flow:
identifying an object that is located at the area where the optical-flow differential exists;
performing a search on the object that is located at the area where the optical-flow differential exists; and
causing a graphical display to display information that corresponds to results from the search.

2. The method of claim 1, wherein the optical-flow differential corresponds to a predetermined user-action of a user of the wearable computing device.

3. The method of claim 1:
wherein the optical flow within the area is of substantially lesser magnitude than the optical flow outside of the area; and
wherein determining that at least a portion of the optical flow for the video has the curvature that is characteristic of the predetermined user-action comprises determining that the characteristic curvature exists in the optical flow outside of the area.

4. The method of claim 3, wherein the predetermined user-action comprises the object remaining in substantially the same location within the user's field of view as the user moves along a substantially circular path around the object.

5. The method of claim 1:
wherein the optical flow within the area is of substantially greater magnitude than the optical flow outside of the area; and
wherein determining that at least a portion of the optical flow for the video has the curvature that is characteristic of the predetermined user-action comprises determining that the characteristic curvature exists within the area.

6. The method of claim 5, wherein the predetermined user-action comprises fixation on the object while the object rotates.

7. The method of claim 1,
wherein the optical flow comprises a plurality of optical-flow vectors at a plurality of sample points in the video, and wherein determining the optical flow comprises generating optical-flow data comprising, for each of the sample points in the video: (a) coordinates of the sample point, and (b) an indication of a magnitude and a direction of the optical-flow vector at the sample point, and
wherein determining that the optical-flow differential exists at the area within the optical flow for the video comprises:
determining a threshold magnitude such that a magnitude for each of a predetermined percentage of the optical-flow vectors is less than the threshold magnitude;
determining which of the optical-flow vectors have magnitudes less than the threshold magnitude; and
determining that the area includes at least a predetermined percentage of the optical-flow vectors that have a magnitude less than the threshold magnitude.

8. The method of claim 1,
wherein the optical flow comprises a plurality of optical-flow vectors at a plurality of sample points in the video,
wherein determining the optical flow comprises generating optical-flow data comprising, for each of the sample points in the video: (a) coordinates of the sample point, and (b) an indication of a magnitude and a direction of the optical-flow vector at the sample point, and
wherein determining that an optical-flow differential exists at the area within the optical flow for the video comprises:
determining a threshold magnitude such that magnitudes of a predetermined percentage of the optical-flow vectors are greater than the threshold magnitude;
determining which of the optical-flow vectors have magnitudes greater than the threshold magnitude; and
determining that the area includes at least a predetermined percentage of the optical-flow vectors that have a magnitude greater than the threshold magnitude.

9. The method of claim 1, further comprising:
using video frames from the video to generate a three-dimensional reconstruction of the object from the video; and
wherein performing the search on the object comprises performing a three-dimensional search on the three-dimensional reconstruction of the object.

10. The method of claim 9, further comprising:
evaluating the three-dimensional reconstruction of the object in order to determine whether there is information that has not been captured, which could improve the three-dimensional reconstruction; and
if it is determined that information that has not been captured and could improve the three-dimensional reconstruction, then initiating a prompt to the user, wherein the prompt directs the user to perform a user-action that is likely to capture, in the video, at least some of the information could improve the three-dimensional reconstruction.

11. The method of claim 1, wherein determining that optical-flow differential exists comprises continually determining optical flow of the video in order to determine when the optical-flow differential exists at the area in the video.

12. The method of claim 1, wherein determining that the optical-flow differential exists at the area comprises:
detecting the optical-flow differential at the area in the video; and
determining that the optical-flow differential persists in the area for at least a predetermined period of time.

13. The method of claim 1, wherein the optical-flow differential is determined to exist between two frames of the video, and wherein identifying the object in the video that is located at the area of the optical-flow differential comprises:
applying an image-processing technique to a first frame of the two frames in order to visually isolate the object in the first frame; and
sending an object-identification request to another computing device, wherein the object-identification request comprises a copy of the first frame having the image-processing technique applied thereto.

14. A non-transitory computer readable medium having instructions stored thereon, the instructions comprising:
instructions for receiving video from a video camera of a wearable computing device;
instructions for determining optical flow for the video;
instructions for determining when an optical-flow differential exists at an area in the optical flow for the video by:
determining that optical flow within the area is of substantially different magnitude than optical flow outside of the area; and
determining that at least a portion of the optical flow for the video has a curvature that is characteristic of a predetermined user-action associated with selection of the object; and
instructions for, responsive to determining that the optical-flow differential exists:
identifying an object in the video that is located at the area of the optical-flow differential;
causing a search to be performed on the object that is located at the area of the optical-flow differential; and
causing a graphical display to display information that corresponds to results from the search.

15. The non-transitory computer readable medium of claim 14, wherein the optical-flow differential corresponds to a predetermined user-action of a user of the wearable computing device.

16. A wearable-computing system comprising:
an interface to a head-mounted display, wherein the head-mounted display is configured to display computer-generated information related to a point-of-view of a user;
an interface to a video camera configured to substantially track the point-of-view of the user; and
an on-board computing system configured to:
determine optical flow for video from the video camera;
determine when an optical-flow differential exists at an area in the optical flow for the video based on (a) a determination that optical flow within the area is of substantially different magnitude than optical flow outside of the area and (b) a determination that at least a portion of the optical flow for the video has a curvature that is characteristic of a predetermined user-action associated with selection of the object;
responsive to determining that the optical-flow differential exists:
identify an object in the video that is located at the area of the optical-flow differential;
perform a search on the object that is located at the area of the optical-flow differential; and
cause the head-mounted display to display graphical information that corresponds to results from the search.

17. The wearable-computing system of claim 16, wherein the determination that the optical-flow differential exists at the area is dependent upon the determination that the optical flow within the area is of substantially different magnitude and the determination that at least a portion of the optical flow for the video has a curvature that is characteristic of the predetermined user-action.

18. The wearable-computing system of claim 16, wherein the on-board computing system configured to:
differentiate between a plurality of types of optical-flow differentials comprising at least a first type and a second type;
determine which type of optical-flow differential exists at the area; and
adjust a manner in which the search on the object is performed based on the determined type of the optical-flow differential.

* * * * *